US006273167B1

(12) United States Patent
Miller

(10) Patent No.: US 6,273,167 B1
(45) Date of Patent: Aug. 14, 2001

(54) LABELLING DEVICE FOR COMPACT DISCS

(75) Inventor: Howard Miller, London (GB)

(73) Assignee: Rocky Mountain Traders, Ltd., London (GB)

( * ) Notice: Subject to any disclaimer, the term of this patent is extended or adjusted under 35 U.S.C. 154(b) by 0 days.

(21) Appl. No.: 09/331,316

(22) PCT Filed: Dec. 17, 1997

(86) PCT No.: PCT/GB97/03463

§ 371 Date: Jun. 18, 1999

§ 102(e) Date: Jun. 18, 1999

(87) PCT Pub. No.: WO98/26986

PCT Pub. Date: Jun. 25, 1998

(30) Foreign Application Priority Data

Dec. 18, 1996 (GB) ............................................... 96262480

(51) Int. Cl.[7] ............................. B32B 31/00; B32B 31/04

(52) U.S. Cl. ........................... 156/391; 156/556; 156/580

(58) Field of Search .................................... 156/556, 538, 156/DIG. 24, 579, 574, 391, 580, 293

(56) References Cited

U.S. PATENT DOCUMENTS

| | | | |
|---|---|---|---|
| 5,543,001 | 8/1996 | Casillo et al. | 156/60 |
| 5,783,033 | 7/1998 | Grossman | 156/556 |
| 5,925,200 | 7/1999 | Grossman | 156/60 |
| 6,149,763 | 11/2000 | Grossman | 156/538 |

FOREIGN PATENT DOCUMENTS

| | | | |
|---|---|---|---|
| 670909 | 8/1997 | (AU) . | |
| 2 009 816 | 3/1972 | (DE) | B65C/9/18 |
| 296 10 120 U | 11/1996 | (DE) . | |
| 296 17 424 U1 | 12/1996 | (DE) . | |
| 2763913 * | 12/1998 | (FR) . | |
| 2305907 | 4/1997 | (GB) . | |

* cited by examiner

*Primary Examiner*—Richard Crispino
*Assistant Examiner*—Sue A. Purvis
(74) *Attorney, Agent, or Firm*—Ohlandt, Greeley, Ruggiero & Perle, L.L.P.

(57) ABSTRACT

A device for applying a label to a disc includes a support member, preferably in the form of a plate for supporting a label on its upper surface, the plate having a central opening through which projects a disc positioning member, for example, in the form of a rod and a carriage member, preferably in the form of a plurality of bearings mounted on resilient arms. The bearings are adapted to move under pressure from above from a first position in which the bearings project upwardly through the opening to support the disc in spaced apart relationship to the label and to retain the label through its central aperture in concentric alignment with the disc to a second position in which the bearings are retracted below the upper surface of the plate for lowering the disc onto the label whereupon the label is adhered to the disc and is no longer retained by the bearings. Release of the downward pressure results in the labelled disc springing up for removal from the device leaving the bearings in their first position ready for repeated use.

20 Claims, 4 Drawing Sheets

LABELLING DEVICE FOR COMPACT DISCS

This invention relates to a labelling device. In particular, the invention relates to a labelling device for concentrically aligning a label with a disc and, more specifically, to a device for centring and applying labels to compact discs.

Electro-optical storage devices presently include Compact Disc Read Only Memory devices (CD-ROMs) which store digital information, the information being either or both audio and visual in nature. CD-ROMs comprise a plastic or "glass" disc which is etched or cut such that when placed in a CD-ROM reader and spun at high speed, the etched pattern may be identified by a laser or other scanning method.

Without some form of external marking, it is virtually impossible to identify the nature or content of the information on a given CD-ROM.

Since the capability of a CD-ROM to faithfully reproduce the information contained thereon depends in large part on the ability of the disc to be placed into a sustained, steady high speed spin about its physical centre, any marking must be done carefully to minimise disturbance of the spin.

Traditional ink based marking methods in which the ink is applied directly to the disc must use an ink that will remain in place during a sustained high speed spin. Additionally, the ink must be non-deleterious to the material of the disc. Use of conventional writing instruments, such as felt tip pens, is generally unsatisfactory since the ink may particulate and become dissociated from the disc with the potential for becoming lodged in the mechanism of the disc reader. In addition, marking in this way does not present a professional appearance if the CD-ROMs are to be sold or used commercially.

Printers specially adapted for printing onto compact discs are available. However, the cost of such printers, currently ranging between £3K and £10K, is prohibitive to those who are producing CD-ROMs in low volumes only.

An alternative to using an ink marker directly on the disc is to use a label, usually a self-adhesive label, which is subsequently attached to the disc. While in theory this seems a simple task, because of the high speed at which the disc must be spun, it is essential that the label be affixed in such a way that the overall balance of the disc is not adversely affected. In particular, it is necessary that the centre of balance of the disc remains about its geometric centre. Labels which are not concentrically affixed to the discs, for example, "half-moon" or semi-circular labels, have previously caused malfunctions and often rendered the discs virtually useless.

One known device for concentrically applying self-adhesive labels to compact discs comprises a first member having a cylinder closed at one end by a slightly convex exterior face with a central aperture corresponding approximately to the size of the central aperture of a label and a second member having a plunger that includes a first portion having a diameter approximating to the diameter of the aperture of the first member and a second portion having a diameter corresponding approximately to the diameter of the central aperture of the compact disc. The first and second portions together form a shoulder against which the compact disc is seated.

In use, the operator must initially position an adhesive label on the first member so that its adhesive surface is uppermost. The label aperture is then aligned with the central aperture of the end face of the cylinder. This step alone can be difficult because of the tendency of the label to stick to the operators fingers and hence move off-centre when the operator withdraws his fingers so that the compact disc can be pressed onto the label. Also, there is a tendency for the label to curl upwards when the operator is not holding the label down.

Once the label is in its desired position on the first member, the compact disc which is retained against the shoulder portion of the plunger can be pressed down onto the label. In order to achieve the desired concentric alignment between the label and the disc, it is necessary to firmly press the disc against the shoulder portion while pushing the first portion of the plunger through the aligned apertures of the first member and the label. Since the surface of the first member against which the label and compact disc are pressed is not planar, further care has to be taken to ensure that no air bubbles are trapped between the label and the disc as such bubbles are not only unsightly but may also cause balancing problems in the CD ROM reader.

It will be appreciated that this known device therefore relies upon the skill and manual dexterity of the operator in order to achieve correct alignment of the label and compact disc. Moreover, the device is reliant upon the operator being sufficiently well-organised to keep the two components in close proximity ready for use.

Accordingly, it is an object of the present invention to provide a device which overcomes the aforementioned problems, permitting reliable alignment of the label and disc and substantially eliminating the opportunity for operator error.

The present invention therefore resides in a device for labelling a disc having a central aperture therethrough comprising:

(i) a member having a substantially flat upper surface for supporting a label;

(ii) a disc positioning member projecting above the upper surface of the support member and for projecting through the central aperture of the disc; and (iii) carriage means adapted to lower the disc down the disc positioning member towards the upper surface in concentric alignment with the label so that the disc and label contact each other.

By means of the invention, the disc positioning member and the carriage means maintain the label and disc in concentric alignment with each other, so no reliance is made on the skill of the operator. Moreover, the invention can be conveniently embodied in an easy to manufacture, hand-held or desktop labelling device.

In a preferred embodiment, the support member is provided with at least one opening in its upper surface through which the disc positioning member extends. Further, the carriage means is advantageously adapted to move from a first position in which it supports the disc in spaced apart relationship to the label to a second position in which it is retracted so that it is level with or below the upper surface, most preferably through the opening provided in the upper surface.

For convenience, and in particular to ensure that the device is always ready for its next operation, the carriage means is preferably adapted to revert automatically to the aforementioned first position after use. This is most readily achieved by resiliently mounting the carriage means on the device.

Usually, the upper face of the label is provided with adhesive such that when the lower face of the disc is brought into contact with the label, the label is stuck to the disc. Thus, when the downward pressure on the disc is removed after contacting the label, the resilient biassing causes the carriage means to return to its first position. In this way, the labelled disc is raised and can be readily removed from the device.

In accordance with a further preferred embodiment, the carriage means comprises a substantially cylindrical body having a central bore through which the disc positioning member extends. The upper end face in use of the cylindrical body provides a carrying surface for the disc and the body is adapted to reciprocate along the disc positioning member to move between first and second positions.

More preferably, the cylindrical body has an outer circumference which approximates the circumference of a central aperture of the label, such that the body retains the label in concentric alignment with the disc which itself is retained through its central aperture by the disc positioning member.

The cylindrical body may comprise a solid body around a central bore, or more preferably comprise a substantially hollow body, ideally with an interior wall to provide the central bore.

The cylindrical body is preferably mounted such that at its uppermost position in use, it is retained on the device. This is most conveniently achieved by the provision of an outwardly directed flange extending from its lower end in use and which has a diameter greater than the diameter of the opening through which it projects in its first position.

In order to return the cylindrical body to its first position ready for use, the body may be mounted on a spring, preferably a compression spring, which urges the body to move from its second position back to its first position. When the cylindrical body is substantially hollow, such a spring may conveniently be at least partially accommodated in the recess created by the hollow body.

It will be appreciated that the circumference of the cylindrical body must be at least fractionally smaller than the opening in the upper surface and above which the body projects in its first position to allow the body to move smoothly between its first and second positions. However, in order to eliminate any "play" in the system which would otherwise allow the label to move fractionally out of alignment with the disc, the body is preferably provided on its outer circumference with one or more outwardly sprung tabs, the tab or each tab serving to hold the label in place as the cylindrical body is depressed when the carriage member travels from its first to its second position.

The free end of each of the one or more tabs is preferably substantially level with the upper end face of the cylindrical body when the body reaches the second position. In this way, the label is held in place by the tab or tabs until the point at which the disc is brought into contact with the label.

Moreover, by virtue of the one or more tabs being outwardly sprung, the one or more tabs act as resilient biassing means to raise the carriage means carrying the now labelled disc from the upper surface of the support member whereupon it can be easily removed and to leave the device ready for its next operation.

The one or more tabs may be provided at its free end with an outwardly directed lip. The lip overlies yet does not contact the uppermost surface of the label when the label is in position on the support member. As will be appreciated, the labels most commonly used are self-adhesive and so the lip assists in preventing the label from being unintentionally lifted off the device when the backing sheet or release layer is removed. Although the one or more of the aforementioned tabs may each comprise separate elements which are affixed to the outer circumference of the cylindrical body, preferably they are formed integrally with the cylindrical body, for example, by cutting the outer wall of the body to form the tab profile and subsequently causing them to flare outwards. It will be appreciated that in the latter case, the cylindrical body will be made from a material which has inherent resilient properties and which can be deformed after cutting so that the tabs are outwardly sprung.

In accordance with an alternative embodiment, the carriage means may comprise a plurality of bearings which, in a first position, project through one or more openings provided in the upper surface of the support member to support the disc in spaced apart relationship to the label resting on the upper surface and, in a second position, lie level with or below the upper surface thereby to apply the disc to the label. Preferably, the one or more bearings each adapted to retain the label on the upper surface in concentric alignment with the disc on the disc positioning member.

Expressed in another way, the labelling device according to another preferred embodiment of the invention, comprises:

(i) a member having an upper surface for supporting the label;

(ii) a disc positioning member extending above the upper surface for retaining the disc through its central aperture; and (iii) a plurality of bearings adapted to move from a first position in which the bearings project above one or more openings provided in the upper surface to support the disc in spaced apart relationship to the label and retain the label in concentric alignment with the disc to a second position in which the bearings are retracted below the upper surface of the support member to lower the disc onto the label.

In order to maintain the device ready for use, the bearings are preferably mounted on resilient support means which, in their normal or "rest" position, urge the bearings to project above the one or more openings in the upper surface of the support member.

Retraction of the bearings can therefore conveniently be achieved by application of pressure to the disc from above against the resilient force thus permitting the disc to descend towards the label which is held in position on the upper surface by the bearings. In this way, it will be appreciated that the bearings function to hold the label in its correct position on the upper surface until the bearings are fully retracted at which point the disc, which is carried or supported on the bearings contacts, and is therefore applied to, the label.

In their first position, the bearings preferably project above a central aperture of the label when the label is placed on the upper surface and retain the label in concentric alignment with the disc retained by the disc positioning member. In particular, the bearings are advantageously positioned along radii extending out from the disc positioning member such that they protrude through the label's aperture and contact the label at points around the aperture.

For most purposes, the central apertures of the label and disc will be circular, in which case the bearings are preferably arranged circumferentially such that they contact or otherwise retain the label at points around the label's inner circumference.

The number of bearings included in the device is not crucial. A minimum of two may be sufficient to hold the label in position and, depending on the area of contact with the disc, may be adequate to stably support the disc above the label prior to depressing the disc onto the label.

It is however preferred to provide more than two bearings both in terms of providing greater reassurance that the label is accurately positioned on the upper surface and better support for the disc. Three bearings are therefore better than two, and four is the most preferred number. There is little benefit in providing more than four bearings, since any advantage is offset by the increased manufacturing costs.

The resilient support means may be formed separately from the bearings or may be integral therewith. For example, the resilient support means may comprise one or more spring members extending in a vertical direction from below the upper surface of the support member in which case the bearings carried on the uppermost end of the one or more springs simply move up and down between their first and second positions. To ensure that the bearings return to their first position after every operation, it is preferred that they are supported on compression springs.

More preferably, however, the bearings are carried on resilient supporting arms which extend substantially horizontally in relation to the support member which, in its preferred form, comprises a plate member. With such an arrangement, the bearings are usually carried at an angle, preferably substantially normal, to the arms such that they project upwardly above the one or more openings in the upper surface of the plate member.

Moreover, to further ensure that the label is retained in position as the bearings are depressed, it is advantageous for the resilient arms to extend along radii towards the disc positioning member such that their free ends lie closest to the disc positioning member. In this way, as the bearings are depressed, not only is there a vertical component to the movement but there is also an inward, horizontal component. This inward movement serves to keep the bearings in contact with the label around its inner circumference until the bearings are fully retracted, at which stage the bearings are displaced such that the label is released and freed to be removed along with the disc.

The one or more resilient arms may each advantageously comprise a leaf spring or cantilever spring fixed at one end with the one or more bearings each located at or towards the free or distal end. Preferably, the one or more resilient arms is integral with the support member.

In order to provide an improved supporting surface for the disc, the uppermost surface of each bearing may be provided with a flange or shoulder portion, for example, in the form of a lip, ridge or protuberance. Preferably, the flange extends substantially horizontally such that it overlies but does not contact the uppermost surface of the label when the label is in position on the support member. In this way, the label is effectively prevented from being accidentally removed from the device while waiting for the disc to be placed over the positioning member. This is particularly useful, for example, when the label is a self-adhesive one and is fitted over the bearings with its release layer still in place. When the release layer is peeled off, there will be a tendency for the label to be lifted upwards but the flanges assist in retaining the label on the device.

Since some labels have a tendency to curl when their release layer is peeled off, the provision of a flange on each bearing also acts to keep the label substantially flat on the support member.

A further advantage in providing horizontally extending resilient supporting arms is that these can be cut or crafted from a single sheet of resilient material. In one particular embodiment, the one or more resilient arms may each be integral with the plate member which constitutes the support member. For example, the plate member itself may be formed of a resilient material with the one or more resilient arms produced by cutting a substantially U-shaped section in the plate member to produce a free end on which a bearing may be formed and a fixed end where it adjoins the remainder of the plate member. Alternatively, the horizontally extending resilient supporting arms may be crafted from a single sheet of material which rests below the plate member.

If the bearings, including the flange members when provided, are integral with the resilient supporting arms, these may be conveniently formed by injection moulding, for example, or by bending or otherwise turning the free ends of the arms through an appropriate angle, most preferably approximately 90°. Indeed, in the latter case, the flange members may be formed by further turning or bending of the free ends of the arms.

Although the support member may be of a thickness to house the bearings in their second position, for example, the one or more openings in the upper surface may comprise one or more recesses of a depth sufficient to accommodate the bearings below the upper surface, it is preferred that the one or more openings each comprises a hole extending through the thickness of the support member. In a preferred form, the support member is in the form of a plate supported from underneath to provide a hollow area below in order that the bearings can be depressed to their second position without obstruction. By such an arrangement, the plate acts as a label positioning platform.

When the carriage means comprises bearings supported on resilient arms, and the arms are formed from a sheet of resilient material which does not constitute the plate member, it may be convenient to fix the sheet between the plate member and the supporting cylinder, for example, by adhesive means or by means of screws or the like. In this way, the position of the bearings themselves is fixed in relation to the plate member.

Ideally, the support member is in the form of a plate which is supported on a cylinder. The cylinder may be open or closed at its base. Moreover, while the depth of the cylinder should be sufficient to accommodate the retracted bearings or cylindrical body or whatever other form of carriage means is adopted, it is advantageous for the cylinder to be relatively "shallow", for example in the form of a collar, as this conserves materials thus making the device cheaper to manufacture.

With regard to the disc positioning member, this is most preferably a rod or stem having a diameter substantially equal to the diameter of the central aperture of the disc. By such means, the disc can be retained in precisely the right position for concentric alignment with the label. The disc positioning member is preferably cylindrical. Moreover, the disc positioning member is generally fixed in relationship to the support member so that the disc slides down the member as the disc is pressed down towards the label on the upper surface of the support member.

To make it easier to insert the rod through the central aperture of the disc by placing the disc over the rod, it is advantageous to provide the rod with a tapered upper end.

In use, the label is positioned on the upper surface of the support member prior to placing the disc on the device. By making the disc positioning member extend above the carriage means in the first, raised position, location of the disc is made easy. In this way, the aperture of the disc can be aligned with the disc positioning member and the disc allowed to drop down until it reaches and is supported on the carriage member, for example on the upper end face of the cylindrical body or on the bearings.

The disc positioning member may extend from the upper surface of the support member and may be formed integrally therewith. In this instance, for example, the bearings will extend above one or more openings in the upper surface to be equidistant from the disc positioning member thereby to retain the label in concentric alignment with the disc on the disc positioning member. In this way, the disc positioning member, the resilient arms, the bearings and the flanges when provided, may be one unit.

Alternatively, the disc positioning member may extend upwards from a location within or below the support member, for example, through an opening therein. In one such embodiment, the disc positioning member preferably extends through an opening in a plate member from a base plate affixed to or integral with a cylinder which supports the plate member. Moreover, the opening in the plate member through which the disc positioning member extends preferably comprises the same opening through which the cylindrical body or bearings project.

With the latter arrangement, only one opening need be provided in the upper surface of the support member. In general, the disc positioning member will extend through the centre of the opening and the cylindrical body or bearings will extend through the opening concentrically around the disc positioning member and adjacent to the perimeter of the opening.

It will be appreciated that the horizontal distance between the outer circumference of the cylindrical body and the disc locating member or between the bearings and the disc locating member will be determined according to the size of the label to be applied, more especially according to the diameter of the label's aperture.

From another aspect, the present invention resides in a method of applying a label to a disc using a device as hereinbefore described.

The invention will now be described by way of example with reference to the accompanying drawings in which:—

Figure 1:
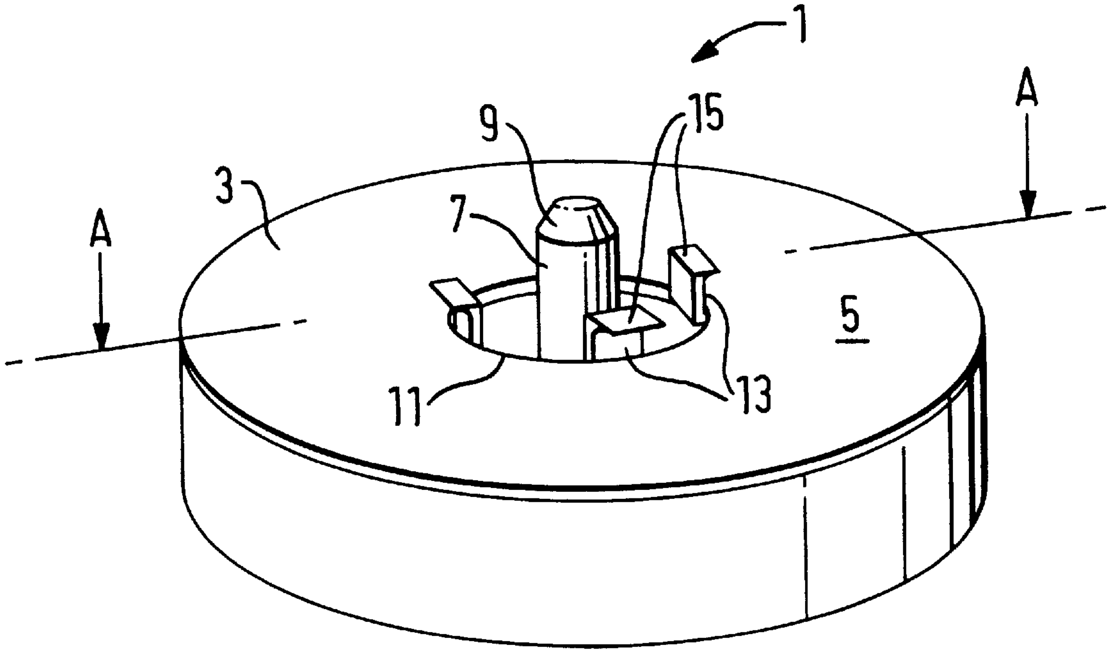
FIG. 1 is a perspective view of a labelling device according to one aspect of the invention.

Referring to FIG. 1, a labelling device 1 includes a support member in the form of plate 3 having an upper surface 5. A disc positioning member in the form of rod 7 having a tapered upper end 9 protrudes through circular opening 11 in the upper surface 5 in a position which is concentrically aligned with the opening 11. Four bearings 13 (one of which is obscured by rod 7) project upwardly through the opening 11 at points around its circumference. Each bearing 13 has a shoulder portion 15 at its respective upper end overlying the upper surface 5.

Figure 2:
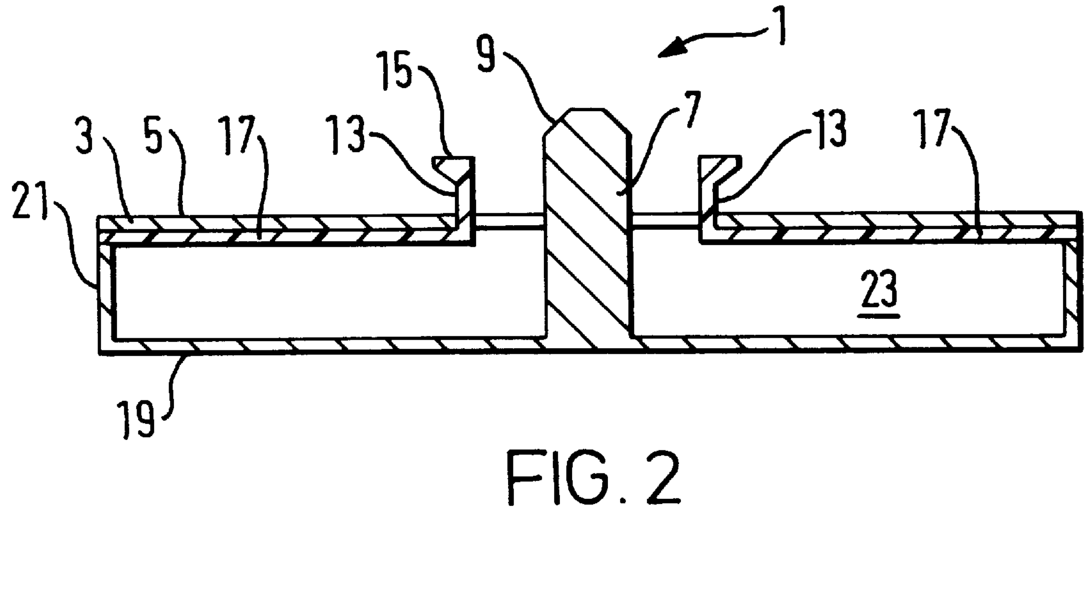
FIG. 2 is a cross-sectional view through line A—A of the device of FIG. 1.

FIG. 2 is a cross-section through the device 1 along line A—A showing the bearings 13 carried on resilient supporting arms 17. Rod 7 extends from the base 19 of the device 1 which together with wall section 21 and plate 3 form a cylinder having a hollow interior 23. The resilient supporting arms 17 adopt a substantially horizontal position in the device's "start" or "rest" mode leaving the bearings 13 projecting above the upper surface 5 ready for use. Essentially, the resilient supporting arms 17 and bearings 13 together act as an L-shaped leaf spring.

Figure 3:
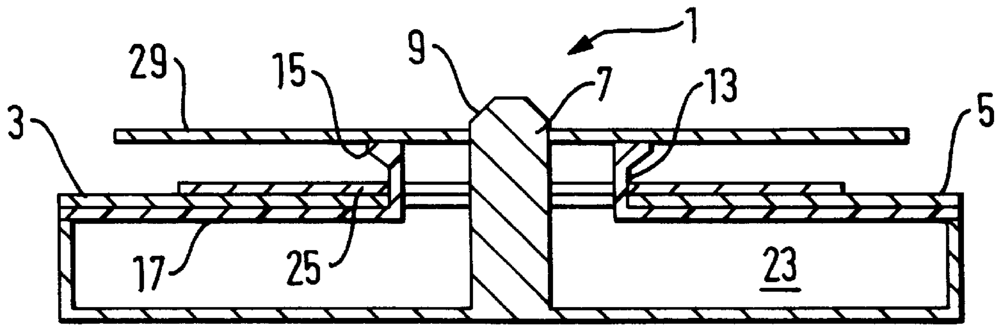
FIGS. 3, 4 and 5 are further cross-sectional views showing the device of FIG. 1 in first, intermediate and second positions respectively with the label and disc mounted on the device.

In operation, as seen from FIG. 3, an adhesive label 25 having a central aperture is positioned on the upper surface 5 such that it is held by the bearings 13 around its central aperture. In positioning the label 25 on the upper surface 5, it is necessary to depress the bearings 13 to allow the label 25 to pass over the shoulder portions 15. Once in position, the label 25 is effectively prevented from being accidentally removed by the shoulder portions 15 which overlap the label 25 adjacent its aperture. The shoulder portions 15 also discourage any tendency for the label 25 to curl. The label 25 is positioned on the plate 3 with its adhesive surface uppermost. If the label 25 is provided with a release layer over its adhesive surface, the release layer may be removed after the label 25 has been positioned on the plate 3.

Once the label 25 has been laid on the upper surface 5, a disc 29 having a central aperture of narrower diameter than that of the label 25 is placed with its aperture over tapered portion 9 and onto the rod 7. The rod 7 is of substantially the same diameter as the aperture of the disc 29 so that it is held in position in concentric alignment with the aperture of the label 25. At this stage, the bearings 13 effectively prevent the disc 29 from contacting the label 25 and the shoulder portions 15 provide steady support for the disc 29.

Figure 4:
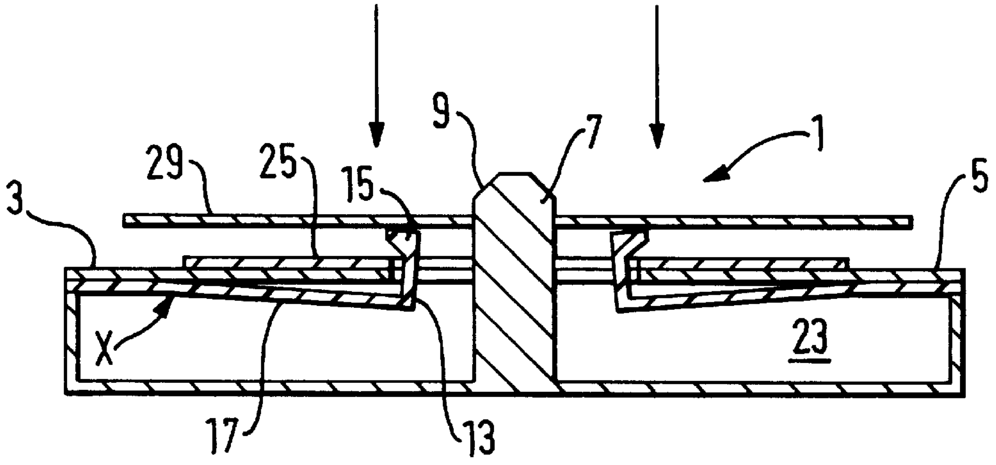
Figure 5:
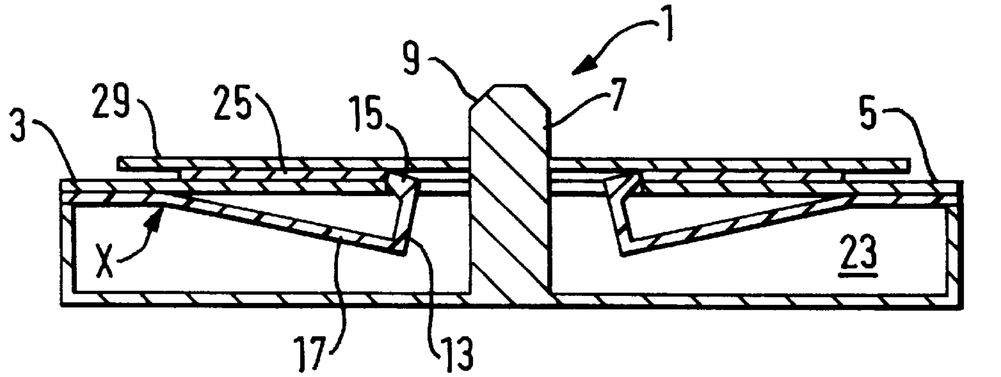

As will be seen from FIG. 4, once the label 25 and disc 29 have been positioned in concentric alignment on the device 1, downward pressure can be applied to the disc 29 from above resulting in the bearings 13 being depressed as the resilient arms 17 are deflected about point X. The disc 29 is lowered under pressure until it comes into contact with the label 25 as shown in FIG. 5. At this stage, the adhesive upper surface of the label 25 causes the label 25 to be adhered to the disc 29.

Moreover, at this fully deflected position, the shoulders 15 of the bearings 13 do not overlap with the upper surface of the label 25 so that the label 25 is effectively freed. Upon release of the downward pressure on the disc 29, both the label 25 and disc 29 which are now adhered together spring upwards under the influence of resilient arms 17. The labelled disc can then be removed from the rod 7 and the device 1 is ready for its next operation.

Figure 6:
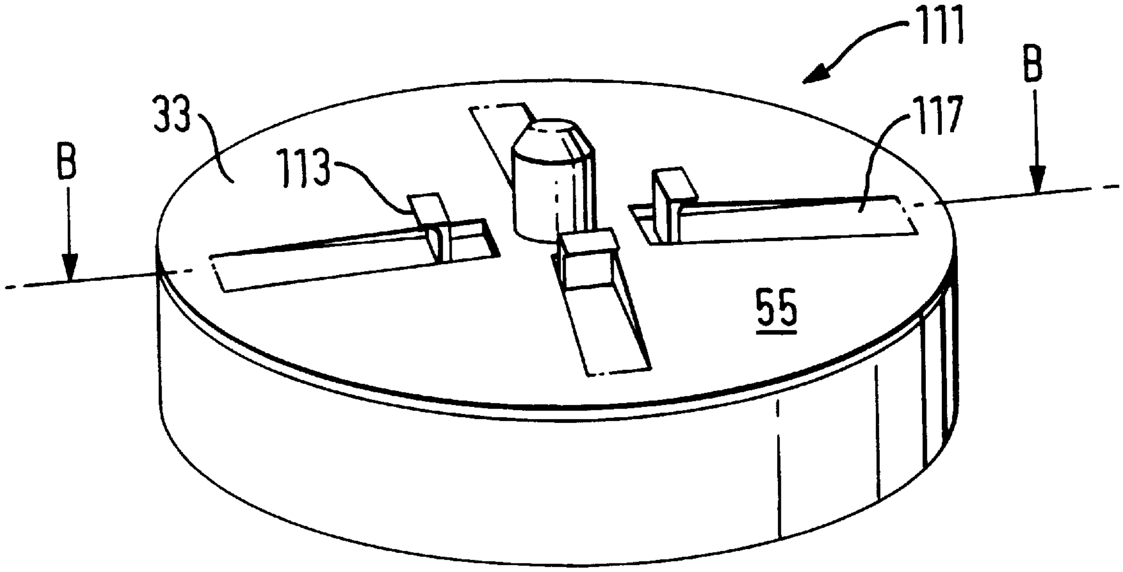
FIG. 6 is a perspective view of an alternative device according to the invention.
Figure 7:
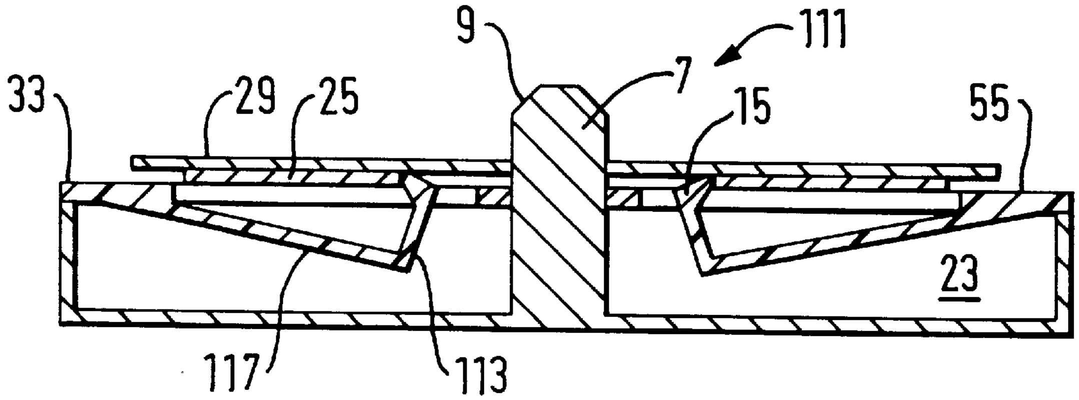
FIG. 7 is a cross-sectional view through line B—B of the device of FIG. 6 in an intermediate position.

An alternative device 111 is shown in FIGS. 6 and 7. The resilient arms 117 of the device 111 are formed from U-shaped sections cut from resilient plate member 33. The free ends of the U-shaped sections are bent through 90° to form bearings 113. FIG. 7 shows the device 111 in the same position as that of FIG. 4, namely with the arms 117 in an intermediate, partially deflected mode.

Figure 8:
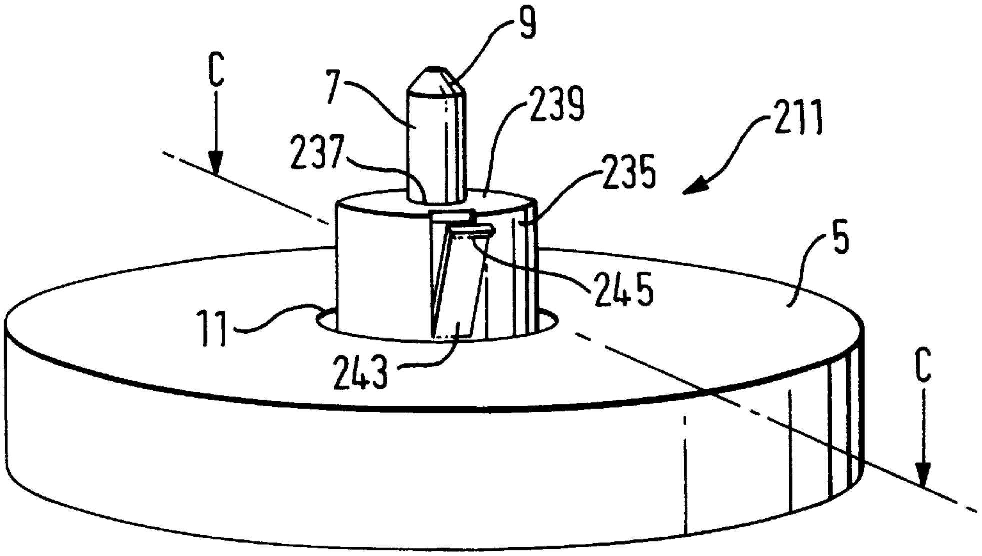
FIG. 8 is a perspective view of a further alternative device according to the invention.
Figure 9:
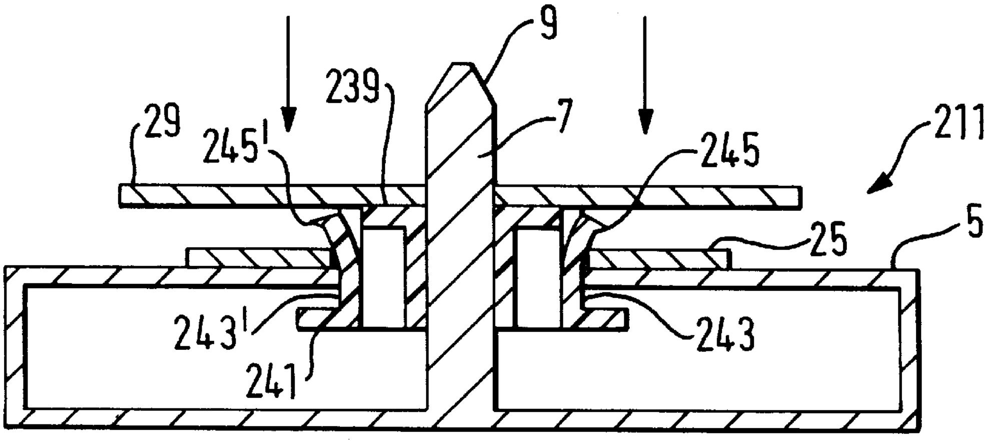
FIG. 9 is a cross-sectional view through line C—C of the device of FIG. 8 in an intermediate position.

Another type of device 211 is shown in FIGS. 8 and 9. Instead of the carriage means comprising bearings 13, 113 mounted on resilient arms 17, 117 as shown in the devices of FIGS. 1 to 7, the carriage means comprises cylindrical body 235 having a central bore 237 through which the disc positioning rod 7 extends. Body 235 has an upper end face 239 which in use supports disc 29. The base of the body 235 has a flange 241 to prevent the body 235 from being detached from the support member through circular opening 11 in the upper surface 5. The body 235 is provided with a pair of resilient tabs 243,243' that are biassed outwards and that are cut from the body and placed at diametrically opposed locations on its outer circumference. At the free end of each tab 243,243' is an outwardly directed lip or shoulder 245,245' to prevent label 25 from inadvertently being lifted off the device 211.

The actual mechanics of labelling a disc using the device of FIGS. 8 and 9 is similar to that described in relation to the devices of FIGS. 1 to 7, except the disc 29 is carried on the upper end face 239. When the label 25 and disc 29 have been positioned respectively on upper surface 5 and upper end face 239, downward pressure on the disc 29 from above against the resilient force of tabs 243,243' causes the body 235 to slide down the rod 7 thus lowering the disc 29 onto the label 25. The tabs 243,243' are forced back into alignment with the cylindrical body 235 as the body descends such that at its lowest position lips 245,245' do not overlap with the label 25 allowing the labelled disc to rise upwards under the action of sprung tabs 243,243' once the downward pressure is removed. In this way, the device 211 is returned to its start position ready for the next labelling operation.

While the invention has been particularly described in relation to a device and method for applying labels to compact discs, it is envisaged that the device and method can be applied to any situation where concentric alignment of two or more substantially planar members each having central apertures is required.

What is claimed is:

1. A device for labeling a disc having a central aperture therethrough comprising:

(i) a support member having an upper surface for supporting a label;

(ii) a disc positioning member projecting above the upper surface of the support member and for projecting through the central aperture of the disc;

(iii) a carriage being adapted to lower the disc down the disc positioning member towards the upper surface of the support member in concentric alignment with the label so that the disc and the label contact each other, wherein the carriage is adapted to return to the first position after use; and (iv) one or more spring elements for urging the carriage from the second position to the first position, wherein the one or more spring elements comprises a leaf spring.

2. A device for labeling a disc having a central aperture therethrough comprising:

(i) a support member having an upper surface for supporting a label;

(ii) a disc positioning member projecting above the upper surface of the support member and for projecting through the central aperture of the disc; and (iii) a carriage being adapted to lower the disc down the disc positioning member towards the upper surface of the support member in concentric alignment with the label so that the disc and the label contact each other, wherein the carriage comprises a substantially cylindrical body having a central bore through which the disc positioning member extends, and an upper end having a carrying face for the disc and, wherein an outer circumference of the cylindrical body is provided with one or more outwardly biased tabs.

3. A device according to claim 2, wherein the one or more tabs each is formed integrally with the cylindrical body.

4. A device according to claim 2, wherein the free end of the one or more tabs is provided with an outwardly directed lip.

5. A device according to claim 4, wherein the one or more tabs has a basically L-shaped configuration.

6. A device according to claim 2, wherein each of the one or more tabs comprises a resilient biassing means to urge the cylindrical body in an upwards direction.

7. A device for labeling a disc having a central aperture therethrough comprising:

(i) a support member having a substantially flat upper surface for supporting a label;

(ii) a disc positioning member projecting above the upper surface of the support member and for projecting through the central aperture of the disc; and (iii) a carriage being adapted to lower the disc down the disc positioning member towards the upper surface of the support member in concentric alignment with the label so that the disc and the label contact each other, wherein the support member is provided with at least one opening in the upper surface through which the disc positioning member extends and into which the carriage is retracted and, wherein the carriage comprises a plurality of bearings which, in a first position, project through one or more openings provided in the upper surface of the member to support the disc in spaced apart relationship to the label resting on the upper surface and, in a second position, lie level with or below the upper surface to apply the disc to the label.

8. A device according to claim 7, wherein one or more of the bearings is mounted on a resilient support means.

9. A device according to claim 8, wherein the resiliently one or more mounted bearings automatically revert to the first position after use.

10. A device according to claim 8, wherein a plurality of the bearings project through the central aperture of the label when the label is supported on the upper surface of the support member, and at least one of the plurality of bearings contacts the label at points around the central aperture.

11. A device according to claim 8, wherein the bearings are arranged circumferentially.

12. A device according to claim 8, wherein the device comprises four bearings circumferentially arranged to contact the label at points around the central aperture of the label.

13. A device according to claim 8, wherein the resilient support means comprise resilient supporting arms extending substantially horizontally in relation to the support member.

14. A device according to claim 13, wherein the resilient supporting arms extend along radii towards the disc positioning member such that the arms have their free ends closest to the disc positioning member and the bearings are mounted on or towards the free ends of the arms.

15. A device according to claim 8, wherein the resilient support means comprises a leaf spring or cantilever spring.

16. A device according to claim 15, wherein the leaf spring or cantilever spring is integral with the support member.

17. A device according to claim 8, wherein the one or more bearings further comprises an uppermost surface having a flange.

18. A device according to claim 17, wherein the flange extends horizontally such that the flange overlies but does not contact the label when the carriage is in the first position.

19. A device for labeling a disc having a central aperture comprising:

a support member having an upper surface for supporting a label;

a disc positioning member projecting above the upper surface of the support member, for projecting through the central aperture of the disc; and a carriage having a substantially planar upper surface for supporting the disc, wherein the carriage is adapted to lower the disc positioning member from a first position down the disc positioning member towards the upper surface of the support member in concentric alignment with the label to a second position so that the disc and the label contact each other, and wherein the carriage further comprises at least one outwardly extending tab.

20. The device according to claim 19, wherein the outwardly extending tab further comprises a shoulder adapted to cooperate with the carriage to support the disc.

* * * * *